United States Patent [19]

Hatakeyama

[11] Patent Number: 4,459,092
[45] Date of Patent: Jul. 10, 1984

[54] APPARATUS FOR INTEGRALLY MOLDING AN ORNAMENT PLATE ON A PLASTIC BODY

[75] Inventor: Yoshiharu Hatakeyama, Tokyo, Japan

[73] Assignee: Yoshida Industry Co., Ltd., Tokyo, Japan

[21] Appl. No.: 397,856

[22] Filed: Jul. 13, 1982

[51] Int. Cl.³ .................... B29D 9/00; B29F 1/022
[52] U.S. Cl. .................... 425/112; 425/117; 425/122; 425/126 R; 425/127; 425/129 R; 425/292; 425/299; 425/405 R; 425/DIG. 60
[58] Field of Search .............. 264/509, 163, 266, 275, 264/259; 425/110, 112, 117, 122, 127, 553, 510, 126 R, 388, DIG. 60, 289, 292, 115, 128, 129 R, 299, 310, 311, 405 R

[56] References Cited

U.S. PATENT DOCUMENTS

| | | | |
|---|---|---|---|
| 3,207,822 | 9/1965 | Makowski | 264/275 |
| 3,267,186 | 8/1966 | Battenfeld | 264/509 |
| 3,296,345 | 1/1967 | Dietz | 264/275 |
| 3,418,691 | 12/1968 | Hann | 425/292 |
| 3,427,688 | 2/1969 | Wilson | 264/275 |
| 3,559,248 | 2/1971 | Stockmann | 264/509 |
| 3,654,062 | 4/1972 | Loew | 264/259 |
| 3,657,405 | 4/1972 | Langecker | 264/509 |
| 3,743,458 | 7/1973 | Hallauer et al. | 425/112 |
| 4,117,069 | 9/1978 | von Holdt | 264/275 |
| 4,144,303 | 3/1979 | Glatt et al. | 264/275 |

FOREIGN PATENT DOCUMENTS

| | | | |
|---|---|---|---|
| 232711 | 8/1963 | Austria | 264/275 |
| 42-11508 | 6/1967 | Japan | 425/292 |
| 901184 | 7/1962 | United Kingdom | 264/275 |

*Primary Examiner*—Willard E. Hoag
*Attorney, Agent, or Firm*—Wenderoth, Lind & Ponack

[57] ABSTRACT

An ornament plate supplied into a mold is punched out from a continuous sheet by a peripheral knife edge at an end of a press core member and advanced to a place which defines a part of a molding cavity. The press core member has a concave space in the end face thereof surrounded by the knife edge, the area of the concaved space being equal, in developed view, to the plane area of the punched ornament plate. The press core member has applied therethrough vacuum by which the punched ornament plate is attracted to the concave end face of the press core member during injection of molten thermoplastic resin.

4 Claims, 10 Drawing Figures

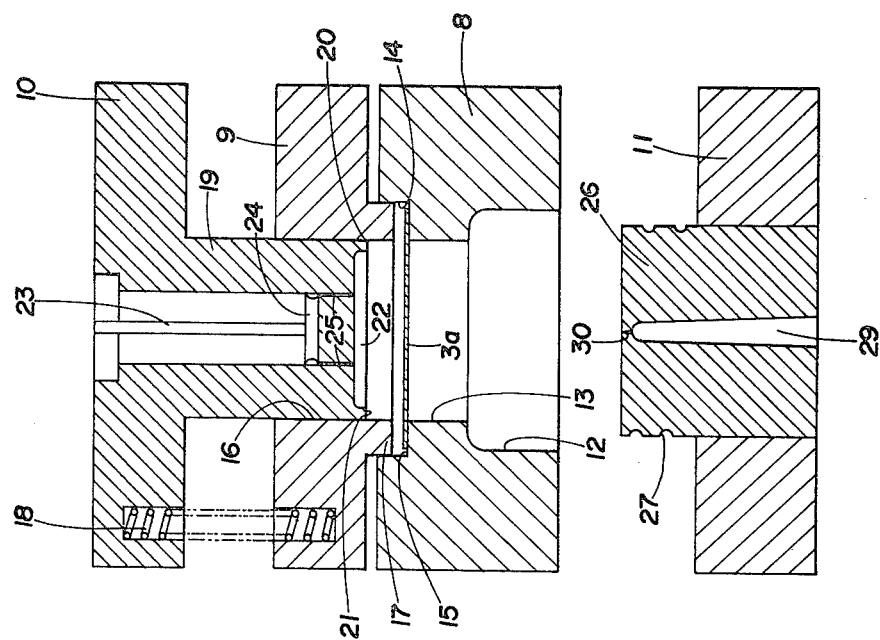
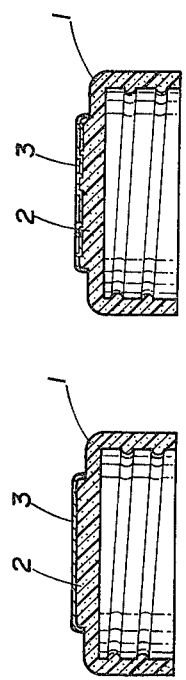
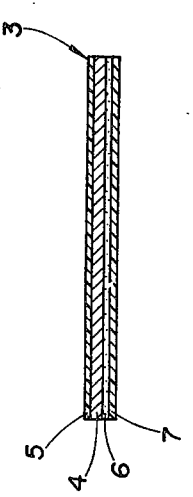

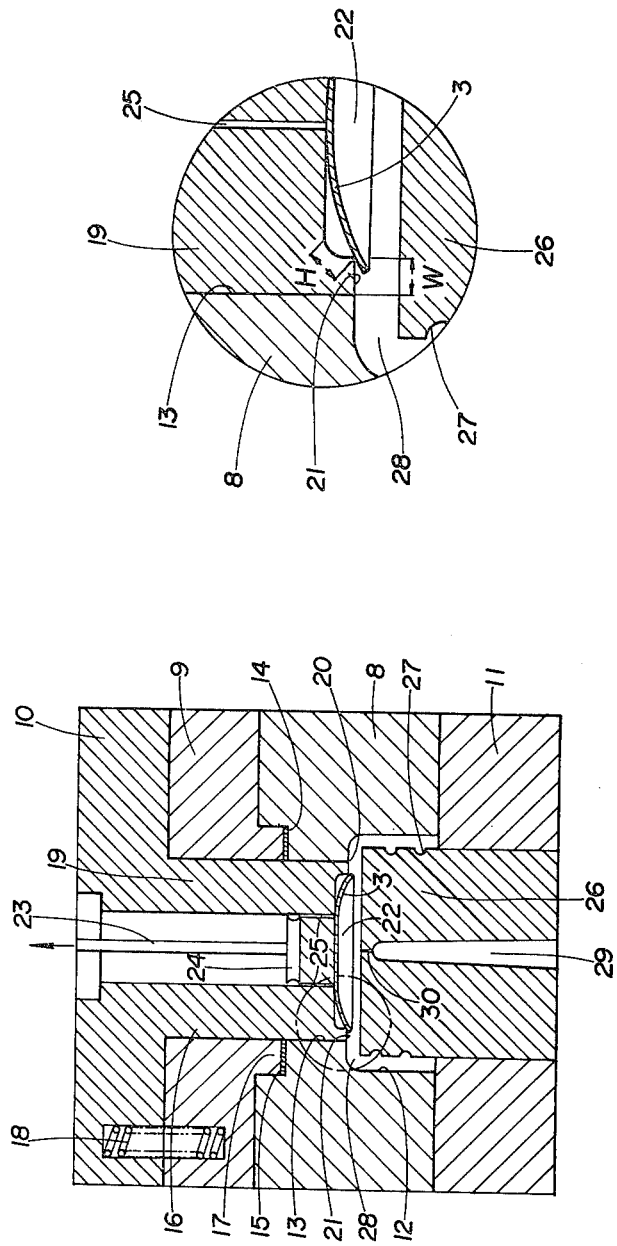

APPARATUS FOR INTEGRALLY MOLDING AN ORNAMENT PLATE ON A PLASTIC BODY

BACKGROUND OF THE INVENTION

This invention relates to an apparatus for integrally molding an ornament plate on a plastic body while forming the latter by injection molding.

There are various kinds and shapes of plastic products formed by injection molding. In one type of plastic product, such as a cap for a cosmetic bottle, it is desired to form a protruded face on the top center part of the plastic cap, for example, and to cover the protruded face thereof by an ornament plate in order to provide a good appearance of the product. Such covering of the ornament plate has to precisely follow the contour of the protruded face of the plastic body so that even the peripheral side wall part thereof is completely enclosed by the ornament plate.

In one conventional method for covering the protruded face of the plastic body, an ornament plate mainly made of a thin plate of aluminum is performed in conformity to the shape of the protruded face of the plastic body by punching out from a sheet of the material of the ornament plate. Then, the ornament plate is covered and attached to the protruded face by using an adhesive agent.

Such conventional method has been inefficient, because two pieces have to be formed separately. Also, since the adhering of the punched ornament plate to the plastic body is effected manually, the positioning of the ornament plate to a predetermined correct position is difficult. Further, due to dimensional variations inevitably caused in mass production of the punched ornament plate and the plastic body, some of the ornament plates cannot be fitted precisely to some of the protruded faces of the plastic body i.e., thus causing inferior adhesion therebetween.

Accordingly, an ojbect of the present invention is to provide an apparatus which can integrally mold an ornament plate on a protruded part of a plastic body while forming the plastic body by injection molding.

Another object of the present invention is to provide such an apparatus whereby the ornament plate can be molded precisely on the protruded part of the plastic body without any possibility of shifting during the injection molding operation.

A further object of the present invention is to provide such an apparatus whereby an embossed pattern can be formed on the surface of the ornament plate while being molded on the protruded part of the plastic body.

SUMMARY OF THE INVENTION

According to the present invention, an ornament plate is integrally molded on a plastic body while forming the latter by an injection molding operation. A substantial part of a molding cavity is formed by closing a female mold block relative to a male mold block, punching out the ornament plate from a continuous sheet, intermittently supplied into the mold, by a movable press core member having a knife edge at the periphery of an end face thereof. The remaining part of the cavity is closed by the ornament plate backed by the press core. Molten thermoplastic resin is injected into the cavity from a gate provided in the opposite side of the ornament plate. The ornament plate is attracted to the end face of the press core by vacuum applied through the latter immediately after being punched out from the continuous sheet, the press core having a concave space at the end face thereof, the area of the concave space being equal, in developed view, to the area of the punched ornament plate. Accordingly, when the molten thermoplastic resin is injected into the cavity, the ornament plate is pressed and deformed along the inner contour of the concave space and integrally covers the protruded portion of the molded plastic body.

The apparatus of the present invention, for integrally molding an ornament plate on a plastic body while forming the latter by injection molding, comprises a female mold block having a cavity and a guide opening axially formed therethrough and communicated with the cavity, a holding plate provided to be moved toward and away from the female mold block and having an axial opening formed therethrough the diameter of which is equal to that of the guide opening and axially registered with the guide opening, means for applying a continuous ornament plate sheet intermittently into a space between the female mold block and the holding plate, the ornament plate traversing the guide opening and the axial opening, a press core member having a projection of the same diameter as the axial opening in the holding plate, the projection having a knife edge at one peripheral end thereof and being movable into the guide opening in the female mold block to punch out the ornament plate, the punched ornament plate closing a part of the cavity in the female mold block, and a male block having a core to be inserted into the cavity of the female mold block and a gate for injecting the molten thermoplastic resin into a molding cavity defined by the female mold block, the punched ornament plate and the male mold block, the gate being provided in the opposite side of the ornament plate. The press core member has a concave space in one end face thereof surrounded by the knife edge, the area of the concave space being equal, in developed view, to the plane area of the punched ornament plate, and the press core member further has a vacuum attraction means therethrough by which the punched ornament plate is attracted in the concave end face of the press core member during injection of the molten thermoplastic resin.

Preferably, the ornament plate has a deformable metal layer on the outer side thereof, and the press core member has an embossed pattern on the end face inside the concave space.

Other objects and features of the present invention will become apparent from the following detailed description of preferred embodiments thereof, when taken in conjunction with the accompanying drawings, in which:

BRIEF DESCRIPTION OF THE DRAWINGS

FIG. 1 is a sectional view showing a cap for a bottle formed by an apparatus in accordance with a first embodiment of the present invention, FIG. 2 is a sectional view showing another cap for a bottle formed by an apparatus in accordance with another embodiment of the present invention, FIG. 3 is a sectional view of an ornament plate to be molded on a plastic body by an apparatus in accordance with the present invention, FIGS. 4 to 7 and 9 are sectional views showing an apparatus of the present invention in operational sequence, and FIG. 8 and FIG. 10 are enlarged views of the circled parts in FIG. 7 and FIG. 9, respectively.

DETAILED DESCRIPTION OF PREFERRED EMBODIMENTS

Figure 5:
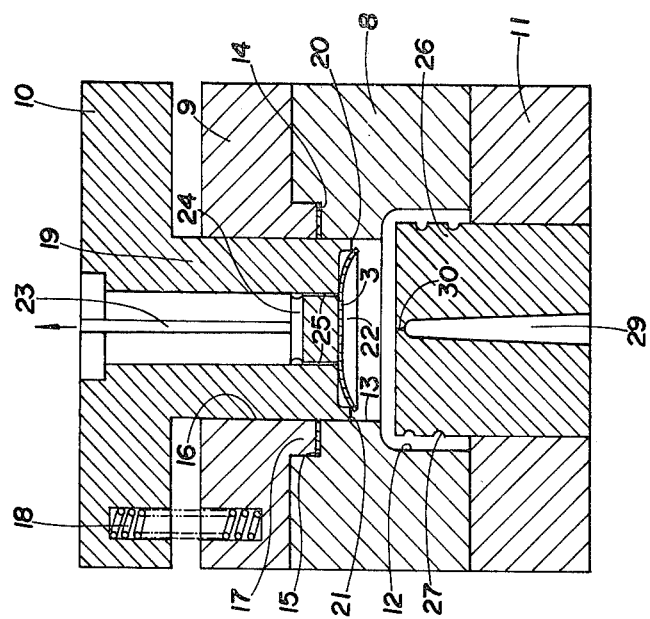

Referring first to a product to be molded in accordance with an apparatus of the present invention shown in FIGS. 1 and 2, a plastic body 1 is formed, for example, in the shape of a cap for threadedly closing an open end of a cosmetic bottle. The plastic body 1 has a protrusion 2 at the top center thereof on which an ornament plate or sheet 3 is integrally molded while the plastic body 1 is formed by injection molding. The present invention provides an apparatus for integrally molding the ornament plate or sheet on the protrusion of the molded plastic body, wherein the ornament plate entirely encloses the protrusion including the peripheral side wall as well as the top wall thereof. The ornament plate 3 is able to have a flat top surface as shown in FIG. 1 or an embossed surface as shown in FIG. 2. The ornament plate 3 to be mounted on the plastic body 1 is shown in FIG. 3, and comprises a flexible and deformable layer 4 such as aluminium foil or plastic film sheet, a protective coating layer 5, an adhesive layer 6, and a plastic film layer 7 which can be fused to be integral with the plastic body 1 in the mold when subjected to heating due to injection molding of the plastic body. The flexible and deformable layer 4 has an ornamental design thereon by printing, hot stamping or the like and is made soft enough to be deformed by the pressure of the injection molding operation. In place of the plastic film layer 7 in the ornament plate 3, a heat sensitive adhesive coating can be provided. The ornament plate 3 molded on the plastic body 1 has been punched out from a continuous strip or sheet 3a, which is intermittently supplied into the present molding apparatus shown in FIGS. 4 through 10.

The molding apparatus of the present invention comprises a female mold block 8, a holding plate 9, a press core 10, and a male mold block 11. The female mold block 8 has a cavity 12 at the axial center part thereof which defines an outside contour of the plastic body 1 to be molded. The plastic body 1 to be molded in this embodiment is a cap for a bottle. Formed through the female mold block 8 in communication with the upper center part of the cavity 12 is a cylindrical guide opening 13 which in turn is communicated with an enlarged cylindrical opening 14 with a shelf 15 therebetween. This shelf 15 is provided for supporting the ornament plate sheet 3a which is supplied into the female mold block 8 at right angles to the axis of the cavity 12.

The holding plate 9 is provided above the female mold block 8 to be moved up and down relative thereto. The holding plate 9 has a cylindrical axial opening 16 of the same diameter as the cylindrical guide opening 13 in the female mold block 8 and a downwardly projecting annular rim 17 surrounding the axial opening 16. The annular rim 17 has an external diameter equal to the diameter of the enlarged cylindrical opening 14 in the female mold block 8, so that the annular rim 17 can snugly enter into the enlarged cylindrical opening 14 and rest upon the annular shelf 15 in the female mold block.

The press core 10 is provided above the holding plate 9 to be moved up and down relative thereto with the assistance of compressible coil spring 18 interposed therebetween. The press core 10 has a downward annular projection 19 the external diameter of which is equal to the diameter of the cylindrical axial opening 16 in the holding plate 9 and also to the diameter of the cylindrical guide opening 13 in the female mold block 8. The annular projection 19 has an annular knife edge or sharp edge 10 at the lower periphery thereof and an annular lower end wall 21 encircling an upwardly concaved or protuding space 22 which defines a cavity for a plastic body to be moved in cooperation with the cavity 12 in the female mold block 8. As shown in detail in FIG. 8, the annulus of the lower end wall 21 has a width (W) equal to the height (H) of the upwardly protruding space 22 so that the external diameter of the annular lower end wall 21 becomes equal to the entire sectional length of the space 22 including the vertical section and horizontal section thereof. In other words, in the developed view, the external diameter of the annular lower end wall 21 is equal to the diameter of the developed upwardly protruding space 22.

In the annular projection 19 of the press core 10, a vertical passage 23 and horizontal passages 24 are provided in communication with each other. The vertical passage 23 is connected with a vacuum source (not shown) and the horizontal passage 24 is connected with the upwardly protruding space 22 by means of a vertically extending annular passage 25.

The male mold block 11 is provided below the female mold block 8 and has an upwardly projecting molding core 26 on the external surface of which a screw thread 27 is formed. The core 26 is arranged to be inserted into the cavity 12 of the female mold block 8 to define an inner surface of a molding space 28 (see FIG. 7) for the cap of the bottle. Provided in the core 26 therethrough is a sprue 29 which terminates in a gate 30 at the upper end of the core 26.

Now, reference is made to the operation of the molding apparatus of the present invention set forth above. In the state shown in FIG. 4, the female mold block 8 is separated from the male mold block 11 after each cycle of molding, from which the molded product has been taken out. The holding plate 9 is also separated from the female mold block 8 by a small amount such that a fresh ornament plate sheet 3a can be advanced into the gap between the shelf 15 of the female mold block 8 and the annular rim 17 of the holding plate 9. The press core 10 is moved up from the holding plate 9 by the action of the coil spring 18 and the annular projection 19 thereof is located in the cylindrical axial opening 16 of the holding plate 9. In such state, the ornament plate sheet 3a is advanced for a predetermined length into the gap set forth above with the ornament surface being opposite to the press core 10, so that a fresh ornament plate section is provided for the next molding process. Preferably, the ornament plate sheet 3a is continuous and is rolled up on a spool and intermittently supplied for a predetermined length into the mold by an appropriate automatic feeding device (not shown).

After the fresh ornament plate sheet 3a is supplied into the mold, as shown in FIG. 5, the female mold block 8 is closed over the male mold block 11, so that the cavity for molding the cap is partially defined between the female mold block 8 and the male mold block 11. At the same time, the holding plate 9 is pressed upon the female mold block 8, whereby the ornament plate sheet 3a is firmly held in position by the annular rim 17 of the holding plate 9 against the annular shelf 15 of the female mold block 8. In this position, the guide opening 13 in the female mold block 8 is registered with the cylindrical axial opening 16 in the holding plate 9 with the ornament plate sheet 3a being interposed therebetween.

Figure 6:
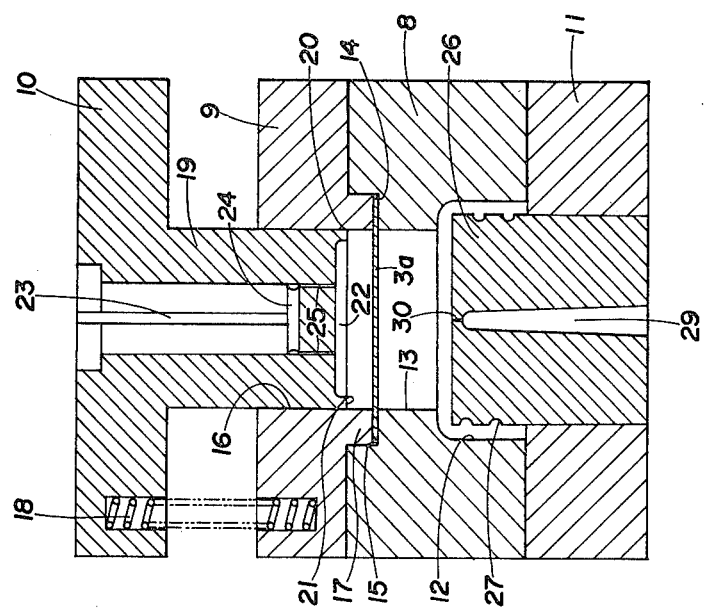
Figure 9:
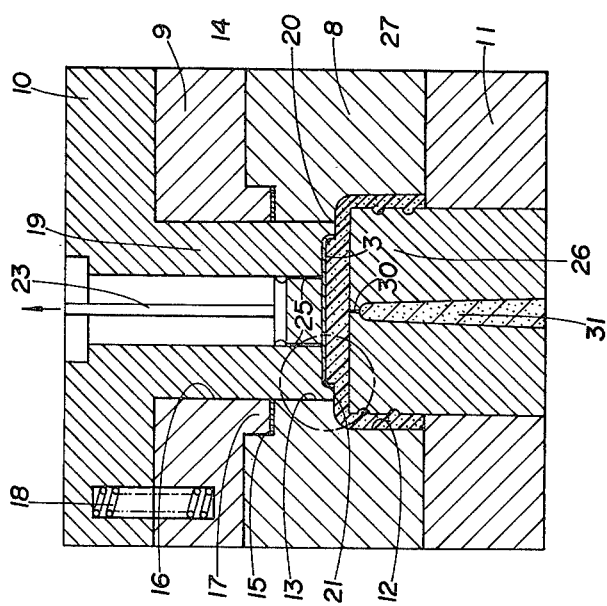
Figure 10:
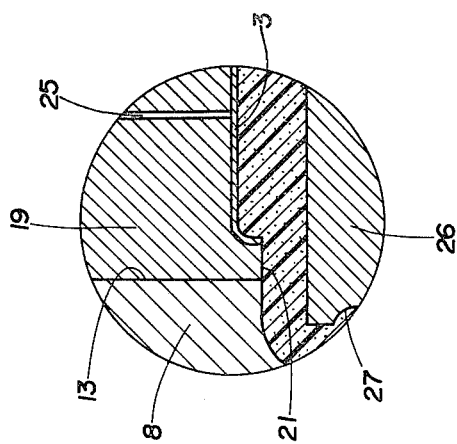

From the position shown in FIG. 5, when the press core 10 is moved down against the coil spring 18, the annular sharp edge 20 at the lower periphery of the press core 10 punches out the ornament plate sheet 3a to form a circular ornament plate 3 which has a diameter equal to the external diameter of the annular lower end wall 21 of the press core 10. Simultaneously, vacuum is applied in the upwardly protruding space 22 at the lower end of the press core 10 through the vertical passage 23, horizontal passages 24 and the annular passage 25, so that the punched-out circular ornament plate 3 is attracted to the top center portion of the upwardly protruding space 22 by the vacuum and is in the form of an arc-shaped member in section, as shown in FIG. 6. The press core 10 is further moved down while the circular ornament plate 3 is attracted into the space 22.

As shown in FIG. 7, when the press core 10 is fully closed over the holding plate 9, the annular lower end wall 21 of the press core 10 comes to the same level as the upper end wall of the cavity 12 in the female molding block 8. At this position, the upwardly protruding space 22 in the press core 10 is communicated with the cavity in the female mold block, so that a complete molding cavity 28 is formed between the female mold block 8, male block 11 and the press core 10. The ornament plate 3 in the cavity 28 extends to close the circumferential lower open end of the upwardly protruding space 22, although the center part of ornament plate is curved upwardly by the applied vacuum.

When a molten thermoplastic resin 31 is injected into the molding cavity 28 through the sprue 29 and gate 30 in the core 26 of the male mold block 11, the ornament plate 3 is pressed against the inner wall of the upwardly protruding space 22 by the pressure of the injected thermoplastic resin 31. It should be noted here that, since the diameter of the ornament plate 3 is equal to the external diameter of the annular lower end wall 21 of the press core 10 which in turn is equal, in developed view, to the diameter of the upwardly protruding space 22, the plane area of the ornament plate 3 is equal, in developed view, to the area of the upwardly protruding space. Therefore, the ornament plate 3 is caused to conform to the inner contour of the upwardly protruding space 22 and is deformed along the inner contour thereof. Also, the lower plastic film layer 7 of the ornament plate 3 is partially fused by the injected molten thermoplastic resin and becomes integral with the injected resin since both of them are selected from those resins which can effect such integral fusion with each other.

In such process of injecting the molten thermoplastic resin, since the ornament plate 3 is attracted by vacuum to the lower end face of the press core 10, there is no possibility that the ornament plate 3 will be shifted from the centered position in the upwardly protruding space 22 of the press core 10 by the injected resin. Thus, the ornament plate 3 can be very accurately mounted on the predetermined protruding part of the molded plastic body in the mold.

In the case that an embossed pattern is to be formed on the ornament plate 3 as shown in FIG. 2, the lower end face of the press core 10, which defines the inner upper wall of the upwardly protruding space 22, has a corresponding embossed pattern preformed thereon. By forming such embossed pattern on the lower end face of the press core 10, when the molten thermoplastic resin is injected in the same manner as set forth above, the ornament plate 3 is deformed along the embossed pattern in the press core 10 by the high pressure applied to the injected resin. Thus, the desired embossed pattern can be formed on the ornament plate simultaneously with the molding of the plastic cp or body 1, as shown in FIG. 2.

After cooling the injected resin 31, the female mold block 8, holding plate 9 and the press core 10 are moved up from the male mold block 11 and separated from each other, as shown in FIG. 4. Then, molded plastic body 1 having the ornament plate 3 thereon is taken out from the mold, thereby completing one cycle of molding. Such cycle of molding is repeatedly effected as usually is the case in mass production.

In the product thus molded, the protruded top center part 2 of the plastic cap 1 is entirely enclosed by the ornament plate 3 including the peripheral side wall thereof, as shown in FIGS. 1 and 2.

Although the present invention has been described with reference to a preferred embodiment thereof, many modifications and alterations can be made within the spirit of the present invention.

What is claimed is:

1. An apparatus for forming a plastic body by injection molding and simultaneously for integrally molding onto such plastic body an ornament plate having an embossed pattern, said apparatus comprising:
   a female mold block having therein a cavity and a guide opening extending axially through said female mold block and opening into said cavity;
   a holding plate mounted for movement toward and away from said female mold block, said holding plate having extending axially therethrough an axial opening having a diameter equal to the diameter of said guide opening, and said axial opening being aligned coaxially with said guide opening;
   means for supplying intermittently a continuous ornament plate sheet into a space between said female mold block and said holding plate when said holding plate is moved away from said female mold block, said sheet being clamped between said female mold block and said holding plate when said holding plate is moved toward said female mold block with said sheet extending transverse to the axis of said guide opening and said axial opening, said sheet being formed of a material capable of being deformed by the pressure of an injection molding operation;
   a press core member mounted for movement toward and away from said holding plate, said press core member having a projection dimensioned to slidably extend into said axial opening and said guide opening, said projection having at the periphery of the end thereof a knife edge for punching from said sheet an ornament plate upon said projection being moved into said guide opening from said axial opening;
   said end of said projection having formed therein a concavity surrounded by said knife edge, the area of said concavity being equal, in developed view, to the planar area of said ornament plate;
   means extending through said press core member and opening into said concavity for applying thereto a vacuum and thereby attracting said ornament plate to the end face of said projection defining said concavity after punching of said ornament plate from said sheet as said projection moves into said guide opening toward said cavity;

a male mold body having a core to be inserted into said cavity of said female mold block, thereby forming a molding cavity defined by said female mold block, said male mold block and said ornament plate held against said end face by said vacuum;

gate means, extending through said male mold block into said mold cavity at a position opposite said ornament plate, for injecting into said mold cavity molten thermoplastic resin, thereby to form in said mold cavity a plastic body, and simultaneously defoming said ornament plate by the pressure of said injecting to conform to the contour of said concavity, thereby integrally molding said ornament plate to the plastic body; and said end face defining said concavity having thereon an embossed pattern, whereby said pressure of said injecting causes said ornament plate integrally molded to said plastic body to be embossed.

2. An apparatus as claimed in claim 1, wherein said vacuum means includes an annular passage formed in said press core member and opening into said concavity.

3. An apparatus as claimed in claim 1, wherein said end of said projection of said press core member has an annular end wall surrounded by said knife edge and defining a periphery of said concavity, the width of said annular end wall being equal to the height of said concavity.

4. An apparatus as claimed in claim 1, wherein said female mold block has therein an enlarged opening spaced outwardly from said guide opening by a transverse shelf, said holding plate has extending therefrom an annular rim adapted to fit into said enlarged opening, the inner periphery of said annular rim being defined by said axial opening, and said sheet being clamped between said annular rim and said transverse shelf.

* * * * *